United States Patent [19]

Shi et al.

[11] Patent Number: 5,739,072
[45] Date of Patent: Apr. 14, 1998

[54] PROCESS FOR IMPROVING THE PHYSICAL AND CATALYTIC PROPERTIES OF A FLUID CRACKING CATALYST

[75] Inventors: Joseph C. S. Shi, Bartow, Ga.; Edwin W. Albers, Annapolis; Geoffrey R. Wilson, Timonium, both of Md.

[73] Assignee: Thiele Kaolin Company, Sandersville, Ga.

[21] Appl. No.: 276,318

[22] Filed: Jul. 15, 1994

Related U.S. Application Data

[63] Continuation of Ser. No. 904,336, Jun. 25, 1992, Pat. No. 5,330,943, which is a continuation of Ser. No. 562,905, Aug. 6, 1990, Pat. No. 5,135,756, which is a continuation-in-part of Ser. No. 321,355, Mar. 10, 1989, Pat. No. 4,946,814.

[51] Int. Cl.$^6$ .............................. B01J 27/16; B01J 21/16
[52] U.S. Cl. ........................ 502/72; 23/293 A; 502/80; 502/84
[58] Field of Search ...................... 23/293 R, 293 A; 502/62, 72, 80, 84

[56] References Cited

U.S. PATENT DOCUMENTS

| | | | |
|---|---|---|---|
| 2,988,520 | 6/1961 | Braithwaite | 423/628 |
| 3,140,249 | 7/1964 | Plank et al. | |
| 3,140,253 | 7/1964 | Plank et al. | |
| 3,210,267 | 10/1965 | Plank et al. | |
| 3,219,590 | 11/1965 | Ribaud | |
| 3,271,418 | 9/1966 | Plank et al. | |
| 3,425,956 | 2/1969 | Baker et al. | |
| 3,436,357 | 4/1969 | Plank et al. | |
| 3,459,680 | 8/1969 | Plank et al. | |
| 3,657,151 | 4/1972 | Noble | |
| 3,844,973 | 10/1974 | Stine et al. | |
| 3,867,308 | 2/1975 | Elliott | |
| 3,957,689 | 5/1976 | Ostermaier et al. | |
| 3,985,846 | 10/1976 | Lundsager et al. | |
| 4,010,116 | 3/1977 | Secor et al. | |
| 4,019,978 | 4/1977 | Miller et al. | 423/628 |
| 4,066,740 | 1/1978 | Erickson | 423/628 |
| 4,072,600 | 2/1978 | Schwartz | |
| 4,154,812 | 5/1979 | Sanchez et al. | 423/628 |
| 4,459,367 | 7/1984 | O'Hara | |
| 4,946,814 | 8/1990 | Shi et al. | 502/62 |
| 5,135,756 | 8/1992 | Shi et al. | 502/62 |

FOREIGN PATENT DOCUMENTS

| | | | |
|---|---|---|---|
| 0291201 | 11/1988 | European Pat. Off. | |
| 7509868 | 3/1976 | France | |
| 0208463 | 5/1984 | Germany | 423/700 |
| 251508 | 7/1986 | Germany | |
| 5734016 | 2/1982 | Japan | |
| 5761615 | 4/1982 | Japan | |
| 7073097 | 5/1982 | Japan | 423/700 |
| 62-153116 | 7/1987 | Japan | |
| 3008213 | 1/1988 | Japan | 423/700 |
| 1497932 | 1/1978 | United Kingdom | |
| WO 89/001362 | 2/1989 | WIPO | |

OTHER PUBLICATIONS

Iler, "The Colloidal Chemistry of Silica and Silicates" Cornell Univ. Press, Ithica, N.Y. (1955).
Hawley's Condensed Chemical Dictionary (New York: Van Nostrand Reinhold Company, 1989), 1111–12.
CRC Handbook of Chemistry and Physics, 62nd ed. (Boca Raton: CRC Press, Inc., 1982), F–35, F–38 & F–39.

*Primary Examiner*—Wayne Langel
*Attorney, Agent, or Firm*—Cammarata & Grandinetti

[57] ABSTRACT

A process for significantly improving the physical and catalytic properties of fluid cracking catalysts (FCC) is disclosed. The invention is a process for manufacturing a fluid cracking catalyst. The process includes adding an effective amount of an acid stable surfactant or an alkaline stable surfactant to a slurry of clay particles and sodium silicate particles. The process then includes forming a sol binder and spray drying the particles. Forming of the dried particles into a catalyst product then occurs.

8 Claims, 2 Drawing Sheets

PROCESS FOR IMPROVING THE PHYSICAL AND CATALYTIC PROPERTIES OF A FLUID CRACKING CATALYST

This application is a continuation application of U.S. application Ser. No. 07/904,336 filed on Jun. 25, 1992, now U.S. Pat. No. 5,330,943, which is a continuation of prior application Ser. No. 07/562,905 filed on Aug. 6, 1990, now U.S. Pat. No. 5,135,756, which is a continuation-in-part of prior application Ser. No. 07/321,355 filed on Mar. 10, 1989, now U.S. Pat. No. 4,946,814.

BACKGROUND OF THE INVENTION

1. Technical Field of the Invention

This invention relates to a process for preparing fluid cracking catalysts (FCC). Particularly, this invention relates to a process for preparing sol-based fluid cracking catalysts by adding acid or alkaline stable surfactants to the component streams prior to the spray drying.

2. Description of the Background Art

Catalyst manufacturers are continuously seeking methods to lower the cost of producing catalysts. Catalyst producers, typically, search for processes to lower the cost of raw materials or utilities, to build higher efficiency equipment or equipment with higher through-put and lower maintenance, or to provide better utilization of zeolite, binder, clay, or added alumina. All of these factors contribute to the direct manufacturing costs of catalysts.

The cost of energy, such as natural gas, has caused the industry to focus its attention on processes which raise the solids levels in feed slurry to a spray dryer. "Higher feed solids" in processes lower the expense of natural gas for spray drying procedures. A catalyst manufacturing facility producing 25,000 to 60,000 tons per year can achieve a savings of a few hundred thousand dollars to over a million dollars per year for every two percent increase in solids.

Numerous processes have been developed by the catalyst manufacturing industry to raise solids in sol binder cracking catalyst production. One general approach that has not been successful is to add concentrated sodium silicate directly to a slurry of clay having about 70 percent solids wherein a portion of the dilution water, that is required for producing the required concentration of sodium silicate of about 12.5 to 13.3 percent $SiO_2$, is supplied by the clay slurry water. A small, but not an insignificant quantity of process water is still necessary with the slurry water method to achieve the proper silicate concentration.

The "CSS process" for producing fluid cracking catalysts involves a continuous mode of preparation of a clay-silicate-slurry using concentrated sodium silicate, high solids kaolin slurry, and process water to achieve the proper concentration of silicate expressed as the percent of $SiO_2$. The resulting clay-silicate-slurry is continuously metered against a stream of acidified alum such as 12.5 percent $H_2SO_4$ and 3.0 percent $Al_2O_3$. Typically, both streams are fed simultaneously into a suction-side of a centrifugal pump or high shear low volume mixer to produce a usable binder. The discharge from the mixing device is then metered continuously against metered streams of zeolite and, in some instances, a stream of alumina depending on the functionality desired for the finished catalyst.

The industry's attempts to produce catalysts by CSS processes have generally resulted in a catalyst material with poor attrition resistance and low bulk density. These two undesirable attributes result in production cost savings, but provide catalysts that are commercially non-competitive.

U.S. Pat. Nos. 3,140,249; 3,140,253; 3,210,267; 3,271,418; 3,436,357; and 3,459,680 to Plank and Rosinski disclose molecular sieve-type cracking catalysts. The world-wide petroleum refining industry rapidly adopted the use of these catalysts in the early 1960's because these catalysts provided significant increases in gasoline yields and improved the coke selectivity obtained with zeolite-containing catalysts when compared to catalysts that are based upon amorphous silica-alumina.

The first molecular sieve-type cracking catalysts incorporated rare earth-stabilized faujasite with silica-alumina in ratios between 2.5 and 3.0. These early formulations were simple admixtures of zeolite-molecular sieves with the amorphous silica-alumina and clay-synthetic gel materials that were previously used alone as cracking catalysts. The molecular sieve component of these catalysts was, typically, added prior to spray drying to the gel slurry. The rapid initial success of these catalysts, because of their increased yield and operational benefits; resulted in the petroleum refining industry demanding fluid cracking catalysts that contained molecular sieves with high silica-alumina ratios. These catalysts provided molecular sieves with silica-alumina ratios approach a value of 5. This ratio imparts superior thermal and hydrothermal stability to a catalyst. The demand was further stimulated by the high temperature regeneration technology introduced in the mid-seventies such as that disclosed in U.S. Pat. No. 3,844,973, and the almost simultaneous development of combustion promoter additives for regeneration of fluid cracking catalysts such as those described in U.S. Pat. No. 4,072,600.

Acceptance of these technologies by the refining industry demanded catalyses with molecular sieves of a higher silica-alumina or "faujasite-type" ratio with higher maintenance of cracking activity or "stability." This demand was due to the more severe operating conditions to which the catalyst was subjected.

Current processes for removing lead from gasoline has further sustained the world-wide demand for high silica-alumina ratio sieves. This demand is due to the improvement in gasoline octane which can be obtained catalytically by converting high silica-alumina ratio molecular sieves into a modified form known as ultrastable-Y or USY materials. The ultrastable form of Y-zeolite zeolite can be achieved by conversion of the sodium form of Y-zeolite (faujasite) before its incorporation into a catalyst. The entire catalyst particle can, alternatively, be treated under conditions which result in an in situ conversion of faujasite within the microsphere itself. The higher the silica-alumina ratio of the starting NaY zeolite, the higher the quality and performance of the resulting ultrastable-Y materials that are prepared either ex-situ or in situ. The phenomenon is, also, noted in the molecular sieves sold under the trade name LZ 210 by Union Carbide Corporation.

There are a number of patents describing processes for preparing molecular sieve-type catalysts including U.S. Pat. No. 3,425,956. U.S. Pat. No. 3,867,308 discloses the use of a silica-sol type binding system in the preparation of zeolite promoted catalysts. U.S. Pat. No. 3,957,689 discloses alum buffered silica-sol. These catalysts, that are based on "sol technology" for the binding system, were developed in response to an increased demand for harder and higher density catalysts to meet the ever tightening environmental constraints being placed on the petroleum refining industry. These patents are typical of the large body of art in this area.

The introduction of sol bound catalysts provided catalysts having significant improvements in density and hardness, However, examination of these catalyst by Scanning Electron Microscopy (SEM) revealed that almost every microspheriodal fluid cracking catalyst particle possessed a "blow-hole" or a cavernous region which caused the particle to be more likely to break into two or more smaller fragments during the FCC operation. When catalyst particles break during the FCC operation, the smaller particle fragments are almost instantly lost through a regenerator flue gas stack. If the particle breakage occurs on the reactor side of the equipment, the slurry oil stream becomes over-loaded with catalyst dust referred to as "fines." This condition can result in the total suspension of the operation of the FCC unit. Such a shutdown of FCC operation is extremely costly to a refinery due to both lost product and unscheduled maintenance expenses. The occurrence of "blow-holes" in catalyst particles can be reduced by changes in the catalyst manufacturing process. These process changes are not necessarily easy or economical and do not eliminated the occurrence of "blow-holes."

The industry lacks efficient and economical methods to produce catalysts having microspheroidal particles without a significant presence of "blow-holes" or cavernous openings.

SUMMARY OF THE INVENTION

The invention is a process for manufacturing a fluid cracking catalyst. The process includes adding an effective amount of an acid stable surfactant or an alkaline stable surfactant to a slurry of clay particles and sodium silicate particles. The process then includes forming a sol binder and spray drying the particles. Forming of the dried particles into a catalyst product then occurs.

DETAILED DESCRIPTION OF THE INVENTION

Figure 1A:
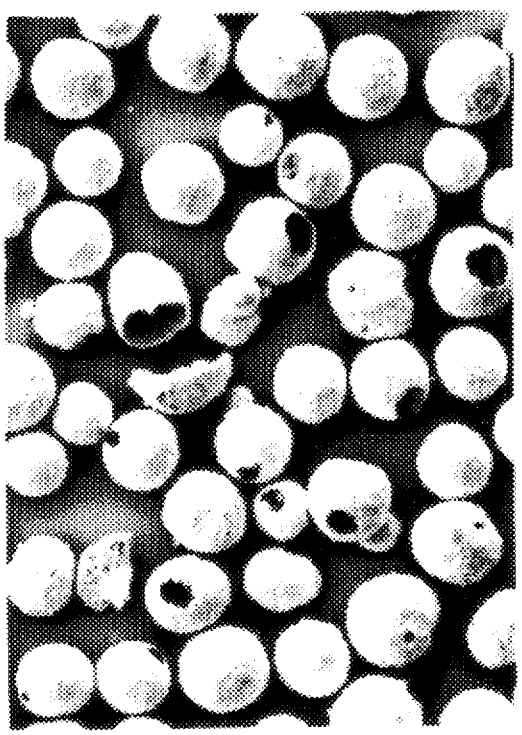
FIGS. 1A and 1B are photo-lithographs illustrating typical catalyst particle morphology provided by a silica-alumina sol-type binder system.

The invention is a process for manufacturing a fluid cracking catalyst. The process includes adding an effective amount of an acid stable surfactant or an alkaline stable surfactant to a slurry of clay particles and sodium silicate particles. The process then includes forming a sol binder and spray drying the particles. Forming of the dried particles into a catalyst product then occurs.

Desirable embodiments of the invention are provided by using a silica-sol binder system buffered with acidified alum as described in U.S. Pat. No. 3,957,689, hereby incorporated by reference. The process of the invention provides fluid cracking catalysts with significantly improved morphology, selectivity, and attrition resistance when compared to catalysts prepared by the same process, but without the surfactant.

Typical preparations of silica sol binder for use with the invention use a silica hydrosol. The silica hydrosol contains, nominally, about 12 percent solids consisting of about 10 percent silica, and about 2 percent alumina from an acidified alum that buffers the sol. The preferred surface active agents or surfactants for most applications are effective in very low concentrations of about 50 to about 1000 parts per million or about 0.005 to about 0.1 percent. This concentration of surfactant is cost effective for fluid cracking catalyst manufacturing processes.

The chemical structure for desirable acid stable surfactants is represented as $R_fCH_2CH_2SO_3(x)$ where $R_f=F(CF_2-CF_2)_{3-8}$ and X can be either H or $NH_4$. The acid stable surfactant can be added to all component streams before final slurring and spray drying. The addition to a single component of the catalyst formulation, however, at a nominal loading of about one pound per 2.5 tons (0.45 kilograms per 907 kilograms) of finished catalyst gives improved attrition resistance and catalytic selectivity compared to catalysts prepared by the prior art processes. The use of an acid stable surfactant or an alkaline stable surfactant according to the invention almost completely eliminates the occurrence of "blow-holes" in catalyst particles. This improvement is apparent from the photo-lithographs figures IA through IVB. Microtome analysis of catalyst particles made according to the invention demonstrates improved dispersion of individual component particles comprising the microspheres themselves. The invention provides a catalyst that has superior density and hardness characteristics.

Acid stable surfactants can be added into any of the component streams of a fluid cracking catalyst manufacturing process, but the greatest improvement in properties of the catalyst are achieved when the surfactant is added to all component streams prior to spray drying. Alkaline stable surfactants are added to the clay and sodium silicate slurry before a sol binder is formed.

The invention of a process using an acid stable surfactant is the subject of the inventors previous application. The inventors have also discovered that the clay and dilute sodium silicate slurry of fluid cracking catalyst manufacturing processes can be mixed together, prior to the formation of the silica sol, with a similar anionic fluorohydrocarbon surfactant to that disclosed in their earlier application.

The anionic fluorohydrocarbon surfactant is stable in a strongly alkaline environment. The commercial surfactant sold by DuPont under the trade name Zonyl FSA is the preferred alkaline stable surfactant for use with this invention. The formation of the clay-silicate-sol binder slurry is very acidic. The other components of the catalyst, such as the zeolite and alumina slurries, can be treated either singly or collectively with another anionic fluorohydrocarbon surfactant after the formation of the clay-silicate-sol binder.

The second anionic fluorohydrocarbon surfactant is stable in a relatively strong acid environment having a pH of about 3.0. The use of the second anionic fluorohydrocarbon surfactant provides further improvement in attrition resistance of the final catalyst. A preferred process adds the acid stable surfactant to the spray drier feed slurry after all components have been thoroughly mixed. The preferred acid stable surfactant is sold by DuPont under the trade name Zonyl TBS.

An essential feature of the invention is the mixing of clay and sodium silicate slurry followed by the addition of an alkaline stable surfactant to this slurry before forming the sol binder. Any alkaline stable surfactant provides satisfactory results when used with the invention. The preferred surfactants are the fluorohydrocarbon surfactants.

The current invention includes processes using combinations of acid stable surfactants wherein one surfactant functions as a specific ionic entity and the other as a non-ionic block/co-polymer. Ionic surfactants and, in particular, the fluorohydrocarbon surfactants are relatively expensive when compared to other surfactants. The combination of these surfactants allows for a reduction in the use of the fluorohydrocarbon surfactant and provides equally effective results for improving the attrition of catalysts prepared with only fluorohydrocarbons surfactants.

The preferred alkaline stable surface active agents are effective in very low, cost effective concentrations of about 50 to about 1000 parts per million or about 0.005 to about 0.1 percent. The preferred surfactants have a chemical structure of $R-CH_2CH_2-SO_3$ (x) where $R = F(CF_2-CF_2)_{3-8}$ and X can be either H or $NH_4$. The surfactant can be added to all component streams before final slurring and spray drying. The addition to a single component of the catalyst formulation, however, at a nominal loading of about one pound per 2.5 tons of finished catalyst provides improved catalyst attrition resistance and catalytic selectivity when compared to catalysts prepared by the prior art processes.

Surfactant concentrations for use with this invention can vary significantly. Any concentration of surfactant that is sufficient to improve the physical and catalytic properties of a fluid cracking catalyst and not adversely effect those properties can be used. A suitable concentration of surfactant is between 0.25 grams per 5 kilograms of spray dried product and 4 grams per 5 kilograms of spray dried product. Desirable concentrations of surfactant are provided with 1 to 2 grams of surfactant per 5 kilograms of spray dried product. The higher concentrations of surfactants do not proportionately improve the characteristics of the resulting product.

The addition of acid stable surfactants and in particular anionic fluorohydrocarbon surfactants to the process slurry significantly improves the physical and catalytic properties of fluid cracking catalysts employing a sol binder. The resulting catalysts have dramatically improved particle morphology with virtual no "blow-holes." The absence of "blow-holes" in the catalyst particles improves the catalyst hardness-attrition resistance. Moreover, the improved distribution of the various component materials such as molecular sieves, clay, and alumina that comprise the microspheroidal catalyst particles results in improved activity and selectivity for the catalyst when compared with identical formulation made under identical conditions, but without the addition or incorporation of any of these surfactants.

Anionic surfactants are the most effective surfactants in acid-sol systems, but combinations of anionic and cationic surfactants for specific components can also be effective. A specific embodiment is the combination of anionic fluorohydrocarbon surfactant in combination with an acid stable non-anionic block co-polymer. Typically, the use has been normalized against the clay level at approximately one pound per ton of clay. Higher loading than this can be used and can be required to impart maximum benefit in the catalytic and selectivity properties for a catalyst manufacturing system.

The exact mechanism by which surfactants function in catalyst manufacturing systems is not clear. An article by Iler, Ralph K., "The Colloidal Chemistry of Silica and Silicates" Cornell University Press, Ithica N.Y. (1955) discloses data for silica-sols having a pH range of 3.0 to 5.0. The charge on sol particles is believed by the authors to be neutral to slightly negative at the higher pH. The sol is very unstable and tends to gel instantly in the pH range 4 to 7. It is possible that an anionic surfactant immediately changes the charge on silica sol micelles to strongly negative and, thereby, renders the sol extremely stable against gelling or polymerization. This has the same effect as raising the pH into a strongly alkaline region, wherein silica-sols are known to be very stable. Maximum attrition resistance benefit from the invention occurs, however, when all component streams are so treated before being combined into a single slurry for spray drying. The addition of the surfactant to the spray dryer feed tank, after all components have been added, also results in an improved attrition resistance.

The porotectosilicates utilized as additive promoters with this invention constitute an unusual class of natural and synthetic materials. They are characterized by having a rigid crystalline framework structure composed generally of an assembly of atoms other than those of oxygen, each surrounded by a tetrahedron of shared oxygen atoms, and a precisely defined pore structure. Desirable crystalline porous tectosilicate additives for use in this invention are described in U.S. Pat. No. 4,521,298 to Rosinski et. al., hereby incorporated by reference. Faujasite is used in the preferred embodiment and throughout the examples below. However, numerous zeolites and molecular sieves are suitable for use with this invention. Molecular sieves such as aluminum-phosphorous-oxide (ALPO) and silica-phosphorous-oxide (SAPO) sold by the Union Carbide Corporation are also suitable for use with this invention.

Additive promoters suitable for use with this invention include aluminosilicates, gallosilicates, ferrosilicates, borosilicates, chromosilicates, aluminogermanates, phosphosilicates, and galoaluminosilicates. The additive promoter can be an aluminosilicate, but aluminum can be replaced in part on in entirely by gallium, iron, boron, phosphorus, chromium or mixtures thereof or even eliminated entirely. Silicon can be replaced, in part or in entirety by germanium.

A first step of the process is the preparation of the aluminum sulfate or "alum" silica sol component. In this step of the process about 0.4 to 0.46 kilograms (kg) of alum is dissolved in 1.7 to 1.8 kilograms of water in a suitable reactor. A quantity of about 0.28 to 0.29 kilograms of concentrated sulfuric acid is added to the solution. The acidified solution is cooled to room temperature and a quantity of sodium silicate, containing about 12.4 weight percent (wt %) silicon dioxide is added with constant stirring. The silicate addition is adjusted to achieve a pH of between about 2.8 and about 3.05 in the resulting slurry.

The clay slurry is prepared in a second step of the process. A sufficient quantity or selected amount of kaolin clay is added to a quantity of water sufficient to prepare a slurry containing about 70 percent solids. The clay is dispersed by adding a dispersant such as tetrasodium pyrophosphate in an admixture with sodium polyacrylate.

The concentrations for a zeolite slurry and an alumina slurry can vary. A desirable aqueous slurry has about 70 percent solids clay slurry for dilution of the sodium silicate to a concentration of about 12.4 weight percent silicon dioxide, thus forming a clay-silicate slurry. Prior to adding this slurry to the acidified aluminum sulfate or alum an alkaline or acid stable surfactant is first added to the clay-silicate slurry (CSS). The most desirable surfactants are those that are only stable in an alkaline environment. Alkaline stable surfactants are commercially available.

The preparation of the clay-silicate slurry is added with constant stirring to the previously prepared alum solution. The clay-silicate slurry addition is adjusted to achieve a pH of about 2.8 to 3.05 in the resulting slurry.

The zeolite slurry is prepared in a third step of the process. A sufficient quantity of, desirably, faujasite is added to a quantity of water sufficient to prepare a slurry containing about 30 percent solids. The pH of the slurry is adjusted to about 4.5 to 4.8 with a 20 percent solution of sulfuric acid. Any faujasite having a "silica to alumina ratio" of about 5 can be used. The faujasite sold under the trade name PQ Valfor CP 300-63 provides satisfactory results.

An alumina slurry is then prepared by adding dry alumina powder to a sufficient quantity of water to prepare a slurry containing about 20 to 25 weight percent solids. The alumina slurry is added to the other ingredients already in the mixing tank to prepare the final spray dryer slurry.

The addition of the surfactant to any one of the component slurries is critical to the invention. The addition is preferably made in the third step of the process, but the surfactant can be added to any one or more of the component slurries individually or after all other components have been combined. The surfactant is preferably diluted from a stock solution before it is used and added as about a 1 percent by weight solution.

A final step of the invention is the spray drying step. Spray drying is a well known and a well established drying procedure for drying slurries. This procedure is accomplished by feeding the slurry to a conventional spray dryer. Desirable drying is provided by feeding the slurry to a spray dryer employing a "spinning wheel atomizer" operated at an atomizer wheel speed of 10,000 revolutions per minute (rpm). The spray dryer is preferably operated at an inlet temperature of about 500 degrees Fahrenheit and an outlet temperature of about 250 degrees Fahrenheit.

Following spray drying and before any physicochemical tests can be conducted on the resulting catalyst, the sodium associated with the zeolite and the occluded salts resulting from the addition of a binder must be removed. One technique to effect removal of the binder is a "pre-exchange" of the zeolite. In another technique low sodium content binders, such as silica sol, silica—alumina sol, or alumina sol are used to avoid washing and/or exchanging with ammonium salts or rare earth salt solutions. However, in the typical commercial operation washing, exchanging, and often intermediate calcination at 1000 to 1100 degrees Fahrenheit are required to adequately reduce the sodium to levels that do not impair the function of a given catalyst formulation.

The addition of a proper surfactant for the clay-silicate slurry, either alone or in combination with other surfactants added to the other component or slurry streams, produces catalysts that are equivalent in physical properties to those prepared by conventional processes. Additionally, the application of a second surfactant added to the zeolite alumina, the acid-alum, or the spray drier feed tank produces catalysts with superior physical properties. The catalytic response of all these embodiments is equivalent to the industry standards for catalysts. The economical benefits of the invention do not result in a sacrifice of catalyst activity or selectivity.

This same technology when applied to mixtures of clay such as (1) kaolinite and Fuller's earth or "montmorillonite", (2) kaolinite and metakaolin, or (3) kaolinite and calcined kaolinite or "mullite or incipient mullite-spinel" produce fluid cracking catalysts with improved attrition values during use. These catalysts have improved cracking ability and are extremely valuable for gas oil feeds which are high in metal contaminants such as Ni and V and high in sulfur contaminants.

This technology can be applied to fluid cracking catalyst additives also. For example, the replacement of the faujasite component in a typical fluid cracking catalyst formulation with a pentasil zeolite, such as that sold under the trade name ZSM-5, in a concentration of 15 to 25 percent results in an octane additive with substantially improved attrition resistance. Since these types of additives are much more expensive to produce than a conventional fluid cracking catalyst and, therefore, more costly for a refiner to use, better unit retention provided by the improved attrition resistance enables a refiner to operate with this type of additive with significant improvement in his over all catalyst costs.

Additives having blends of clays with kaolin in the absence of zeolite also perform well as metal "getters" or SOX-type additives. In the past, these same combinations of clays have been tried without success, not because of their lack of functionality as metal "gettering" or SOX reduction, but simply because the attrition resistance of the fluid additive particles was poor.

FIGS. 1 through 4 illustrate scanning electron microscope (SEM) photo-lithographs at different magnifications for fluid cracking catalysts with and without the acid stable surfactants. Examples with specific fluorhydrocarbon surfactants are included. The particles of these photo-lithographs were formulated with 25 percent sodium zeolite in the Y form, 23 percent silica, 10 percent alumina, and 42 percent clay using a silica-sol type binder system.

Figure 1B:
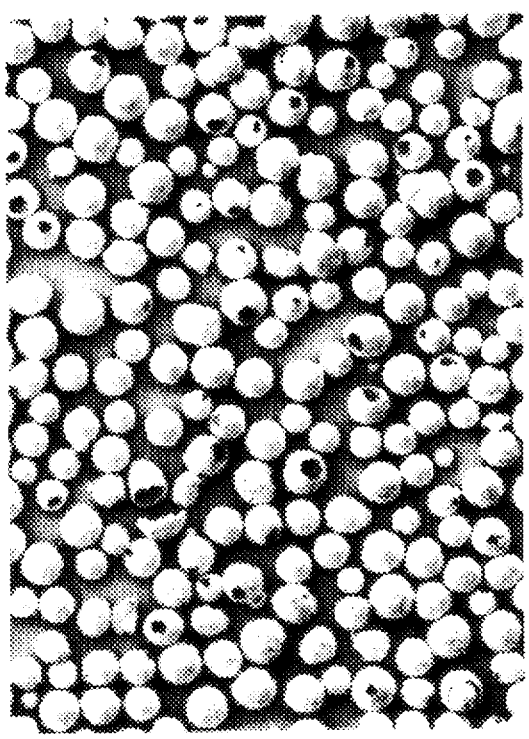

FIGS. 1A and 1B represent a typical morphology for this general type of binder system. The overwhelming majority of particles have "blow holes" and in some instances the thin shell character is easily discernible. This particular sample of particles had a Corrected Attrition Index of 12.13 and a Attrition Rate of 2.3.

Figure 2A:
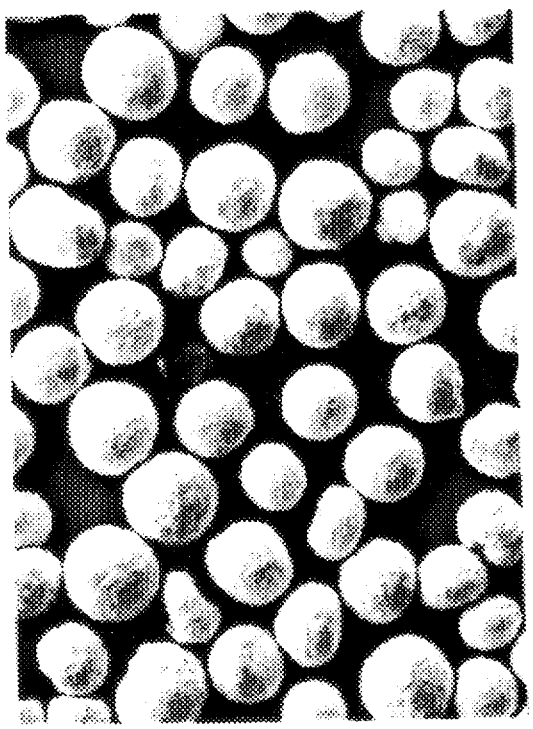
FIGS. 2A and 2B are photo-lithographs illustrating catalyst particle morphology that is produced by the addition of fluorohydrocarbon surfactants to a clay slurry.
Figure 2B:
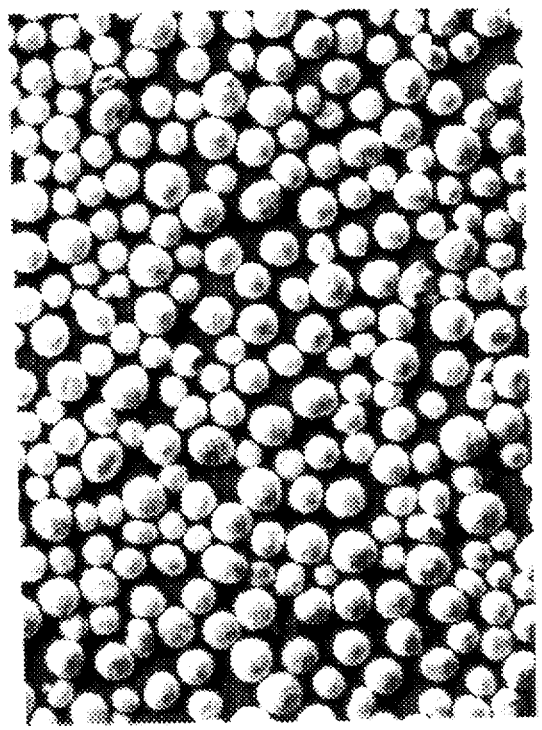

FIGS. 2A and 2B depict the effect on particle morphology when specific acid stable fluorohydrocarbon surfactants are added to the clay slurry. The "loading" for these particles was 1 gram of a fluorohydrocarbon surfactant, sold under the trade name FC-95 by the 3M Company, per 2442 grams of clay. Examination of photo-lithographs demonstrates the almost complete elimination or absence of "blow-holes" in the particles. Moreover, broken remnants of particles indicate that a more homogeneous solid particle is provided by the invention. The attrition data for this sample had a Corrected Attrition Index of 2.39 and Attrition Rate of 0.48.

Figure 3A:
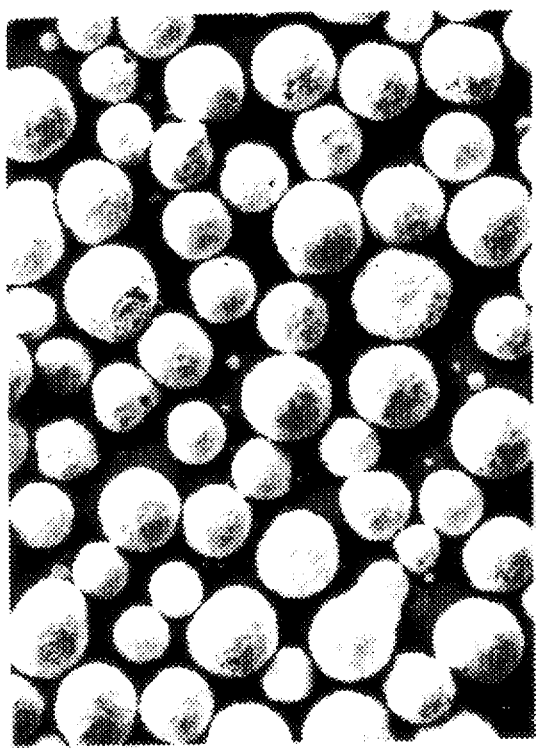
FIGS. 3A and 3B are photo-lithographs of a catalyst product that is produced by the addition of an acid stable surfactant to a clay slurry.
Figure 3B:
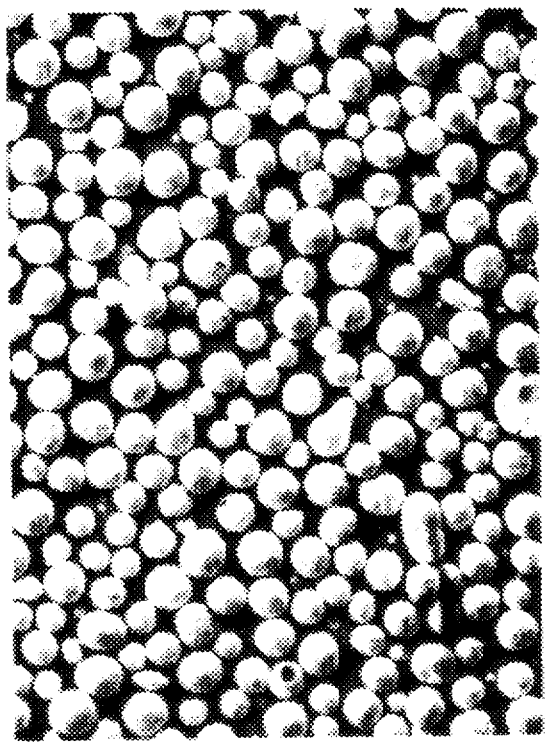

Comparable results are obtained for the product sold under the trade name Zonyl TBS at an equivalent surfactant loading. The two surfactants provide similar morphological results, but Zonyl TBS product results in a more homogenous particle. This result is evident from the smaller size of the openings and a thicker shell for the particles. FIGS. 3A and 3B illustrate the results of this surfactant.

Figure 4A:
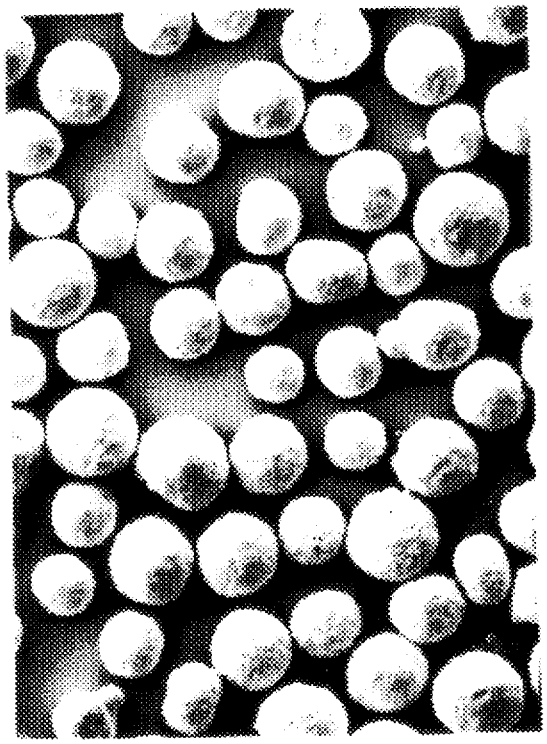
FIGS. 4A and 4B are photo-lithographs of a catalyst product that is produced by the addition of an acid stable surfactant to a clay slurry.
Figure 4B:
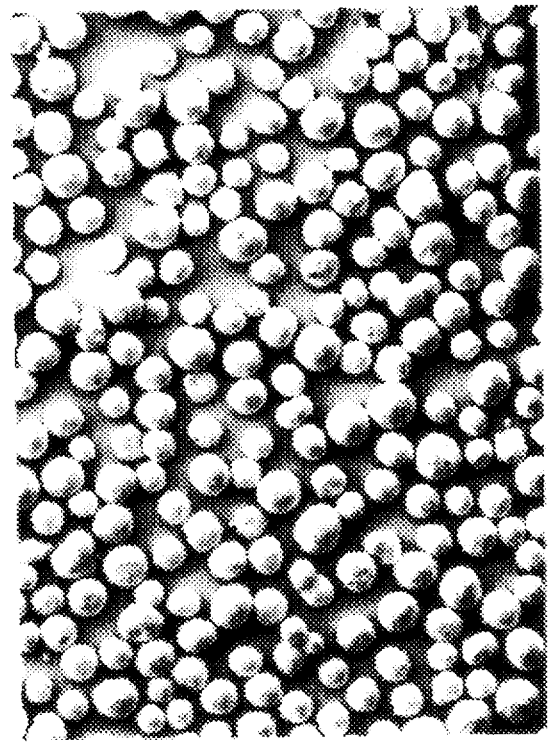

FIGS. 4A and 4B illustrate the results provided when the loading of Zonyl TBS product has been increased to 2 grams per 2442 grams of clay. The photo-lithographs show particles having almost a complete absence "blow-holes" and, correspondingly, no thin shell formation. The attrition data for this sample had a Corrected Attrition Index of 1.32 and Attrition Rate of 0.26.

The invention provides desirable fluid cracking catalysts as well as desirable hydrocracking and hydrotreating catalysts or non-catalytic or separation-type materials. Other notable benefits of the invention include the control of particle size and improved randomization of individual component particles in binding ceramics and superconducting formulations based on a variety of inorganic oxide systems which contain identical or similar oxide components to those used in the production of FCC catalysts and additives. The invention improves any system wherein the electrical charge distribution of individual components, under normal processing, prevents or hinders the integrity and functionality of the final material being processed, the application of the invention changes the charge distribution of the individual component particles, such that the obtained materials, so treated, have improved integrity and functionality.

The zeolite content of catalyst particles can be increased by the invention to a 50 percent level without a major loss in the integrity of the catalyst particle. This technology in catalyst formulations based on 50 percent zeolite input enables the production of catalysts which can operate in a commercial unit. High doses or the correct level and combination of one or more surfactants can achieve attrition resistance values for catalysts that are comparable to the standard catalyst formulations that are currently used by the industry. The examples describe below are operable in a commercial unit.

EXAMPLES

The following Examples represent the process of the invention. Examples 1 through 4 represent the process of the invention that utilizes acid stable surfactants as disclosed in the parent application. Examples 5 through 12 represent the process of the invention that utilizes alkaline stable surfactants.

The following Comparative Example and Examples refer to "Run Numbers" when describing actual embodiments of the invention. The use of this term was adopted by the inventors for convenience and is not an indication of an actual number of runs or completed reductions to practice of the invention.

General Procedure

The following general procedure was used in the Comparative Example and the Examples of the invention.

1. A quantity of the spray dried material (260–270) grams were slurried in 800 to 1000 ml. of water heated to 140 to 160 degrees F. (60 degrees C. to 71 degrees C.).

2. The slurry was dewatered in a Buchner funnel.

3. A solution of ammonium sulfate was prepared by dissolving about 140 to 160 grams of ammonium sulfate in 1300 to 1600 grams of water. The filter cake was rinsed with about 1600 grams of this solution that had been heated to 140 to 160 degrees F. (60 degrees C. to 71 degrees C.).

4. The filter cake was then rinsed with 100 to 1400 milliliter of water that was heated to between 140 and 160 degrees F. (60 degrees C. and 71 degrees C.).

5. The filter cake was reslurried and the pH of the resulting slurry was recorded.

6. A rare earth exchange was completed by adding a solution of rare earth chloride hexahydrate containing 2 grams of the hexahydrate per 100 grams of finished catalyst. The finished catalyst contained 1 percent rare earth oxide. The pH was adjusted to a pH of 4.7 to 5.0 and was maintained at that value for about 10 minutes.

7. The slurry was dewatered in a Buchner funnel and rinsed with about 1200 milliliters of water heated to between 140 and 160 degrees F. (60 degrees C. and 71 degrees C.).

8. The filter cake was dried at 450 degrees F. (232 degrees C.) followed by calcination of the dry powder at 1000 degrees F. (538 degrees C.) for one hour.

After drying, the finished catalyst was prepared according to the are for subsequent testing.

9. Steps 1 through 4 were repeated. The product was washed with 1800 milliliters of water heated to between 140 and 160 degrees F. (60 degrees C. and 71 degrees C.).

10. The filter cake was dried for 4 hours at a temperature of 450 degrees F. (232 degrees C.) and the catalyst product was recovered.

The process described above is used to prepare a faujasite containing rare earth containing catalyst. The novel process can also be used to prepare amorphous gel-based catalysts.

If a catalyst devoid of rare earth is to be prepared the rare earth exchange step is eliminated. The calcination temperature in step 8 can be performed at temperatures between 1000 and 1500 degrees F. (538 degrees C. and 816 degrees C.) depending on the type of hydrogen Y catalyst being prepared.

Attrition Test Procedure

The following procedure was used in the Comparative Example and the Examples to evaluate the attrition of a catalyst.

The attrition test is similar to that described in U.S. Pat. No. 4,010,116. The procedure for the measurement is as follows.

1. A sample of catalyst is calcined in a muffle furnace at 1000 degrees F. (538 degrees C.) for 1 hour.

2. A 45.0 gram sample of calcined catalyst is mixed with 5 grams of water in a capped container and shaken to humidify the catalyst. The sample is then allowed to cool for approximately 15 minutes.

3. The humidified catalyst is charged to the attrition tube with a low air flow rate already established or about 1.5 liters/minute.

4. The test air flow rate of 9 liters/minute is established.

5. After 1 hour, the fines collection thimble is quickly replaced by a fresh collection thimble and the weight of collected fines is determined.

6. Step 5 is repeated at hourly intervals for a desired period. The Examples were determined using 3 hours and extrapolating to the normally quoted 5 hour value.

7. The hourly data is either plotted or entered into a computer program to give three attrition parameters discussed below. The results are expressed in terms of the following parameters.

ATTRITION INDEX (AI) at 5 hours—This value is the total amount of fines expressed as a weight percent (%), collected in the fines collection thimble after exactly 5.0 hours. The collection of data at a time not corresponding exactly to hourly intervals was corrected either graphically or by linear regression fitting. This parameter is an indicator of short term catalyst loss in the commercial operation. A hard catalyst is considered to have an AI of 7 or lower. Values of 12 and lower are commercially acceptable.

ATTRITION RATE This index is the rate of fines generated between 1 and 5 hours expressed as weight percent per hour. This parameter is an indicator of the longer term loss of catalyst in the commercial FCC unit resulting from attrition. Generally, values of 1.0 and less are desired.

INITIAL FINES (Intercept) this is the amount of fines generated at time zero in the test. This parameter is an indication of the amount of fines (0 to about 20 microns) present in the original spray dried catalyst. As such, it is an indicator of the amount of fines which will be lost immediately from the commercial unit when fresh catalyst addition is made.

CORRECTED ATTRITION INDEX (CAI) this is the Attrition Index minus the Initial Fines. This represents a correction for the amount of 0 to 20 micron material in the original sample as charged to the test.

Comparative Example A

Preparation of The Catalyst Without The Addition of Acid Stable or Other Surfactant Preparation of Acid/Alum Silica Sol Binder An acid/alum solution was prepared by mixing the following components in the ratios shown to the volume needed. A quantity of 0.454 kilograms (kg) of aluminum sulfate was mixed well with 1.79 kg of water. The mixture was agitated well until all the aluminum sulfate had been dissolved. After the sulfate had been dissolved 0.029 kg of 95–98% sulfuric acid was added. This solution was then cooled to at least 86 degrees F. (30 degrees C.) before it was used. The acidified alum solution was pumped into a high shear mix pump and simultaneously a stream of sodium silicate, containing 12.4 wt % silica, was also pumped into the mix pump. The silicate flow rate is adjusted to achieve a pH in the mixing pump. The silicate flow is rate adjusted to achieve a pH in the mixing pump discharge in the range of 2.80–3.05. A 3:1 flow of silicate to acidified alum was typically required to achieve the desired pH range.

Clay Slurry

A slurry of Kaolin clay was made up to a 70% solids slurry, measured by O'Haus moisture balance, using as dispersing agents TSPP and sodium polyacrylate (NaPa) slurry make-up water in the following proportions, 0.24% TSPP predissolved in hot water to a 10% solution, and 0.25% NaPa, based on the weight of as is air float clay. The dispersant is first added to the make-up water followed by the dry clay which is added under high shear agitation.

1. The binder solution was prepared consisting of acid/alum and sodium silicate as described above.

2. The required amount of the binder was transferred to a mix tank under a high shear mixer. The temperature and pH of the mix were recorded.

3. The required amount of clay slurry, prepared as described above was added to the high shear mix tank. Thetemperature and pH of the mix was recorded.

4. A zeolite slurry was prepared by slurring dry zeolite powder in water to 30% solids and the pH of the slurry was adjusted to 4.5–4.8 using 20% sulfuric acid. This slurry was then added to the high shear mix tank. The temperature and pH were recorded. We have found PQ Valfor CP 300-63 dry zeolite powder to be suitable.

5. An Alumina slurry was prepared by slurring dry alumina powder in water. This may conveniently be in the amount of water required to adjust the drier feed slurry to its desired water and solids content. Normally a calculated 22 weight percent (wt %) solids was employed. This alumina slurry was added to the other catalyst ingredients already in the mix tank under high shear agitation to produce the final spray drier feed slurry. The temperature and pH were recorded. Any suitable alumina powder can be used. For the purpose of this invention Alcoa Alumina Powder CP-2 was used.

6. The spray drier feed was pumped to a Anhydro Model Type III-A No. 4 spray drier employing a spinning wheel atomizer. Operating conditions were, 500 degrees F. (260 degrees C.) inlet temperature, 250 degrees F. (121 degrees C.) outlet temperature, atomizer wheel speed 10,000 rpm.

Table 1 indicates typical results obtained when catalysts were prepared by the prior art procedure. Catalyst hardness as expressed by the CAI index were in excess of 6 weight percent per hour and the attrition in excess of 1.3 weight percent per hour on a rate basis.

TABLE 1

| Run No. | 167 | 185 |
|---|---|---|
| NaY | 2636(25) | 2636(25) |
| Alumina | 526(10) | 526(10) |
| Silica sol | 11500(23) | 11500(23) |
| Clay | 3545(42) | 3545(42) |
| Sol pH | 2.93 | 2.97 |
| Sol Temp./C. | 33 | 31 |
| Feed pH | 3.27 | 3.29 |
| CAI | 9.83 | 9.03 |
| Att./Rate | 1.97 | 1.80 |

Notes
No additives were used in these runs.
Component inputs are shown as weight in grams and the number in ( ) is the percent material on a silica/alumina basis.

Example 1

Catalyst Preparations Employing Dupont Zonyl Tbs Surfactant

The procedure of Comparative Example A was followed except that the desired amount of additive in the form of a 1 gm/100 ml prediluted solution was added to the weighed amount of the desired component slurry.

Tables 2 and 3 present the data obtained using the procedure of our invention wherein the acid stable dispersant was Dupont Zonyl TBS. Catalysts were prepared with a range of zeolite contents from 10 to 25% at 18% binder expressed as silica. The attrition indexes are considerably lower (Table 2) than those of the prior catalysts of Comparative Example A. All catalysts of our invention had a CAI value of less than 5.00 and an attrition rate of less than 1.00.

TABLE 2

| ADDITION OF SURFACTANT TO OTHER CATALYST COMPONENT SLURRIES | | | | |
|---|---|---|---|---|
| Run No. | 181 | 182 | 183 | 184 |
| NaY | 2636(25) | 2636(25) | 2636(25) | 2636(25) |
| Alumina | 526(10) | 526(10) | 526(10) | 526(10) |
| Silica sol | 11500(23) | 11500(23) | 11500(23) | 11500(23) |
| Clay | 3636(42) | 3636(42) | 3636(42) | 3636(42) |
| Sol pH | 3.00 | 3.01 | 3.00 | 3.00 |
| Sol Temp. C. | 32 | 31 | 33 | 34 |
| Feed pH | 3.29 | 3.27 | 3.20 | 3.27 |
| CAI | 0.79 | 1.90 | 1.85 | 2.29 |
| Att. Rate | 0.16 | 0.38 | 0.37 | 0.46 |
| Surf./g | 1.00 | 1.00 | 1.00 | 1.00 |
| Add. Point | Silica | Zeolite | Alumina | SD Feed |

Notes
Dupont Zonyl surfactant diluted/1 gram/100 ml of water
Surfactant was added and mixed into the individual component prior to addition of the component to the high shear mix tank.
Components inputs are shown by weight in grams and the number in ( ) is the percent material on a silica/alumina basis.

TABLE 3

PREPARATION USING 18% BINDER

| Run No. | 150 | 163 | 164 | 165 |
|---|---|---|---|---|
| NaY | 2636(25) | 2136(20) | 1591(15) | 1045(10) |
| Silica sol | 9000(18) | 9000(18) | 9000(18) | 9000(18) |
| Alumina | 526(10) | 526(10) | 526(10) | 526(10) |
| Clay | 3955(47) | 4364(52) | 4818(57) | 5227(62) |
| Sol pH | 2.95 | 2.96 | 3.00 | 2.95 |
| Sol Temp. C. | 36 | 36 | 35 | 36 |
| Feed pH | 3.33 | 3.20 | 3.31 | 3.20 |
| CAI | 4.04 | 1.70 | 2.42 | 1.37 |
| Att. Rate | 0.81 | 0.34 | 0.49 | 0.27 |
| Surf., gm | 1.12 | 1.24 | 1.36 | 1.48 |

Notes
Dupont Zonyl TBS Surfactant diluted on the basis of 1 gram/100 ml water and added to the clay slurry.
Surfactant loading is normalized to equal 1 gram per 2442 grams of as is clay.
Component inputs are shown by weight in grams and the number in ( ) is the percent material on a silica/alumina basis.

Table 4 demonstrates the effect of varying the Zonyl from 1 to 4 grams per 2442 gm of as is clay. The data again indicates substantial improvement over the prior art catalysts of Comparative Example A. No further improvement appears to be observed when the surfactant level is raised to 2 gms to 4 grams per 2442 gm of as is clay.

TABLE 4

PREPARATION USING 23% BINDER

| Run No. | 170 | 171 | 180 |
|---|---|---|---|
| NaY | 2636(25) | 2636(25) | 2636(25) |
| Silica sol | 11500(23) | 11500(23) | 11500(23) |
| Alumina | 526(10) | 526(10) | 526(10) |
| Clay | 3545(42) | 3545(42) | 3545(42) |
| Sol pH | 3.01 | 2.97 | 3.00 |
| Sol Temp. C. | 34 | 33 | 31 |
| Feed pH | 3.26 | 3.31 | 3.23 |
| CAI | 2.44 | 1.32 | 1.30 |
| Att. Rate | 0.49 | 0.26 | 0.26 |
| Surfactant, gm. | 1.00 | 2.00 | 4.00 |

Notes
Dupont Zonyl TBS Surfactant diluted on the basis of 1 gram/100 ml water and added to the clay slurry.
Surfactant loading is normalized to equal 1 gram per 2442 grams of as is clay.
Component inputs are shown by weight in grams and the number in ( ) is the percent material on a silica/alumina basis.

Example 2

Catalyst Preparation Employing 3M FC-95 Surfactant

Catalysts were prepared by the procedure of Example 1 using an acid stable surfactant produced by 3M designated FC-95. The attrition data on these catalysts is presented in Table 5. When compared to a catalyst prepared by the prior art procedure catalysts prepared with the acid stable surfactant all had a substantially improved attrition over a range of surfactant from 1 to 4 gm per 2442 gm of as is clay.

TABLE 5

SURFACTANT 3M FC 95

| Run No. | 93 | 94 | 96 |
|---|---|---|---|
| NaY | 1888(25) | 1888(25) | 1888(25) |
| Alumina | 526(10) | 526(10) | 526(10) |
| Silica sol | 11500(23) | 11500(23) | 11500(23) |
| Clay | 3545(42) | 3545(42) | 3545(42) |
| Sol pH | 3.02 | 2.97 | 3.10 |
| Sol. Temp. C. | 18 | 12 | 12 |
| Feed pH | 3.19 | 3.12 | 3.33 |
| Feed. Temp. C. | 9 | 11 | 10 |
| CAI | 3.88 | 3.19 | 3.40 |
| Att. Rate | 0.78 | 0.64 | 0.70 |
| Surfactant, g. | 1.00 | 2.00 | 4.00 |

Notes
Surfactant added as a dry powder to the clay slurry on the basis of 1 gram per 2442 grams of as is clay.
Clay slurry made up using 0.5% TSPP
The Zeolite source had a lower moisture content therefore the weight used in each prep is less.
Component inputs are shown by weight in grams of as is component and the number in ( ) is the percent material on a silica/alumina basis.

Example 3

Addition of Surfactant to Other Components of the Catalyst

Test were performed to determine the effects of adding acid stable surfactant to the other components of the catalyst slurry. Table 6 and Table 7 demonstrate that the surfactant is effective when added to any of the catalyst components individually (Runs 181,182 and 183) to the spray dryer feed (Run 184) or all components (Runs 178 and 179). Again the improvement is substantial when compared to catalysts prepared by the processes of the prior art.

TABLE 6

ADDITION OF SURFACTANT TO CATALYST SLURRIES

| Run No. | 181 | 182 | 183 |
|---|---|---|---|
| NaY | 2636(25) | 2636(25) | 2636(25) |
| Silica sol | 11500(23) | 11500(23) | 11500(23) |
| Alumina | 526(10) | 526(10) | 526(10) |
| Clay | 3636(42) | 3636(42) | 3636(42) |
| Sol pH | 3.00 | 3.01 | 3.00 |
| Sol Temp. C. | 32 | 31 | 33 |
| Feed pH | 3.29 | 3.27 | 3.20 |
| Feed Temp. C. | 22 | 22 | 25 |
| CAI | 0.79 | 1.90 | 1.85 |
| Att. Rate | 0.16 | 0.38 | 0.37 |
| Surfactant, gm. | 1.00 | 1.00 | 1.00 |
| Add. Point | Silica | Zeolite | Alumina |

Notes
Dupont Zonyl TBS Surfactant diluted on the basis of 1 gram/100 ml of water.
Surfactant was added to and mixed into the individual components prior to adding the component to the high shear mix tank.
Component inputs on an as is basis are shown, but as weight in grams and the number in ( ) is the percent material on a silica/alumina basis.

TABLE 7

ADDITION OF SURFACTANT TO CATALYST SLURRIES

| Run No. | 184 | 178 | 179 |
|---|---|---|---|
| NaY | 2636(25) | 2636(25) | 2636(25) |
| Silica | 11500(23) | 11500(23) | 11500(23) |
| Alumina | 526(10) | 526(10) | 526(10) |
| Clay | 3636(42) | 3636(42) | 3636(42) |

TABLE 7-continued

| ADDITION OF SURFACTANT TO CATALYST SLURRIES | | | |
|---|---|---|---|
| Run No. | 184 | 178 | 179 |
| Sol pH | 3.00 | 2.97 | 2.95 |
| Sol Temp. C. | 34 | 32 | 32 |
| Feed pH | 3.27 | 3.23 | 3.26 |
| Feed Temp. C. | 26 | 24 | 21 |
| CAI | 2.29 | 1.90 | 0.74 |
| Att. Rate | 0.46 | 0.38 | 0.15 |
| Surfactant, gm. | 1.00 | 0.50 | 1.00 |
| Add. Point | S. D. Feed | | in all components |

Notes
Dupont Zonyl Surfactant diluted on the basis of 1 gram/100 ml of water.
Surfactant was added to and mixed into individual components prior to adding the component to the high shear mix tank.
Components inputs are shown by weight in grams on an as is basis and the number in ( ) is the percent material on a silica/alumina basis.

Example 4
Preparation of Spray Dried Air Float Kaolin Employing 3M FC-95 Surfactant In this example the procedures for preparing the clay slurry described in Comparative Example A were followed except that the clay component was first spray dried either with or without the addition of the 3M FC-95 acid stable surfactant prior to spray drying. Each of the slurries was prepared to contain 0.25 percent TSPP and 0.25 percent sodium polyacrylate.

After the spray dried kaolin sample was prepared aliquot amounts were mixed with water to prepare slurries containing 65–70 percent solids. The slurry was subsequently incorporated into the spray drier feed tank containing the other catalyst components.

The attrition data for the catalysts prepared by this procedure along with the simulated aging data are compared with the data for the catalysts prepared without the surfactant in Table 8. The simulated aging data was collected by aging comparable samples of treated and untreated spray dried kaolin for 5 days at a temperature of 180 degrees Fahrenheit. At the end of this time the aged spray samples were reslurried and used in preparation of catalysts.

TABLE 8

*ATTRITION AND AGING DATA FOR CATALYST
PREPARED FROM KAOLIN TREATED WITH
3M FC-95 BEFORE SPRAY DRYING

| Run No. | Type | Age | CAI | Rate |
|---|---|---|---|---|
| 119 | *AF-STD-P | 0 | 8.32 | 1.08 |
| 120 | **AF-STD-P, FC-95 | 0 | 3.16 | 0.63 |
| 131 | *AF-STD-P | 5 days*** | 9.70 | 1.93 |
| 132 | AF-STD-P, FC-95 | 5 days* | 3.84 | 0.77 |

*AF-STD-P Standard Catalyst Preparation (see Table 1, runs 167 and 185 using air float clay (AF)
**FC-95 added — 1 gram per 2442 grams of air float clay (AF)
***Aging at 180 degrees F. (82 degrees C.)

It is apparent from the data presented in Table 8 that the catalysts prepared from the treated spray dried kaolin showed a marked improvement over the non-treated versions. The treated samples showed good stability under the accelerated aging test when compared to the non treated samples. This is apparent from a comparison of runs 120 and 132 with runs 119 and 131.

Example 5
Catalyst Preparations Using CSS Processing and Combination of Acid Stable Anioionic Surfactants This example uses a major portion of the dilution water for preparing the dilute sodium silicate that is supplied by the kaolin slurry. The kaolin slurry is comprised of approximately 70 percent solids as described in Comparative Example A.

Prior to preparing the clay-silicate-slurry (CSS) DuPont Zonyl FSA, an anionic alkaline stable surfactant, is added to the clay slurry. This treated slurry is mixed with sodium silicate to form the clay-silicate-slurry component with 12.5–13.2 percent $SiO_2$. A small amount of water is necessary to achieve the proper silicate concentration which can be added to the concentrated sodium silicate before or after forming the clay-silicate-slurry component.

The resulting clay-silicate-slurry component is then fed directly to the suction-side of a centrifugal pump which simultaneously draws a stream of acid-alum as described in Comparative Example A. The clay-silicate-slurry flow is adjusted to achieve a pH in the discharge of the pump between 2.80 and 3.05. The flow of CSS to acidified was adjusted to achieve the desired pH range.

Table 9 presents the data obtained when the clay-silicate-slurry is treated with an alkaline stable anionic surfactant alone and in combination with an acid stable surfactant such as DuPont Zonyl TBS wherein the Zonyl TBS is added either to the zeolite component, the acid-alum, or the spray drier feed tank. As described in the previous application U.S. Ser. No. 07/321,355, the preferred addition point for the Zonyl TBS is the spray drier feed tank. The improvement in attrition resistance is substantial when preparing catalysts in the CSS mode using the combination of anionic, alkaline, and acid stable surfactants. The improvement is substantial when the surfactant is added to a specific component stream which is either alkaline or acid prior to mixing the individual components or after all components have been added. The attrition data prepared for this series of catalysts are summarized in Table 9A.

TABLE 9

ATTRITION RESPONSE IN A STANDARD
CATALYST FORMULATION USING AN ANIONIC ACID
STABLE BLOCK CO-POLYMER
STANDARD FORMULATION:
25 NaY, 23 SiO2, 10 CP-2 AL2O3, 42 AF CLAY

| RUN NO. | T-334X | T-335X | T-336X | T-337X |
|---|---|---|---|---|
| NaY | 1955(25) | 1955(25) | 1955(25) | 1955(25) |
| Alumina | 526(10) | 526(10) | 526(10) | 526(10) |
| Silica sol | 11500(23) | 11500(23) | 11500(23) | 11500(23) |
| Clay | 3682(42) | 3682(42) | 3682(42) | 3682(42) |
| Sol pH | 3.00 | 3.10 | 3.00 | 3.00 |
| Sol Temp. C. | 37 | 37 | 37 | 37 |
| Feed pH | 3.30(33) | 3.40(32) | 3.40(32) | 3.40(33) |
| CAI | 10.83 | 6.11 | 4.90 | 5.55 |
| Att./Rate | 2.17 | 1.22 | 0.98 | 1.11 |
| Addition Point of Surfactant | BLANK | Clay Slurry | Clay Slurry | Clay Slurry |
| Type and | — | BASF Block Co-Polymer Pluronic 25 R 2 | BASF Block Co-Polymer Pluronic 25 R 2 | BASF Block Co-Polymer Pluronic 25 R 2 |
| Amount of Surfactant | | 2 grams | 4 grams | 10 grams |

Note:
Surfactant added on the basis of 1.0 gram per 2442 grams of AF Clay.

TABLE 9A

CSS PROCESSING WITH COMBINATIONS OF ANIONIC TYPE ALKALI AND ACID STABLE SURFACTANT
STANDARD FORMULATION:
25 NaY, 23 SiO2, 10 CP-2 Al2O3, 42 AF CLAY

| RUN NO. | T-291X | T-292X | T-293X | T-294X |
|---|---|---|---|---|
| NaY | 2636(25) | 2636(25) | 2636(25) | 2636(25) |
| Alumina | 526(10) | 526(10) | 526(10) | 526(10) |
| Silica sol | 14818(23) | 14818(23) | 14818(23) | 14818(23) |
| Clay | 14818(23) | 14818(23) | 14818(23) | 14818(23) |
| Sol pH | 3.00 | 3.00 | 3.10 | 2.90 |
| Sol Temp. C. | 30 | 32 | 32 | 30 |
| Feed pH | 3.30(19) | 3.20(19) | 3.30(18) | 3.20(19) |
| CAI | 5.60 | 3.20 | 1.24 | 2.74 |
| Att./Rate | 1.12 | 0.64 | 0.25 | 0.55 |
| Type of Surfactant(s) | Zonyl | Combination of Zonyl FSA & TBS | Combination of Zonyl FSA & TBS | Combination of Zonyl FSA & TBS |
| Add. Pt.(s) of Surf.(s) | FSA added to clay-silicate slurry (CSS) | FSA added to CSS and TBS added to zeolite slurry | FSA added to CSS and TBS added to spray drier feed tank | FSA added to CSS and TBS added to acid-alum |
| Amount of Surfactant(s) | 1 gram | 1 gram FSA and 1 gram TBS | 1 gram FSA and 1 gram TBS | 1 gram FSA and 1 gram TBS |

Note:
Both surfactant inputs are based on 1 gram surfactant per 2442 grams of AF clay.

Table 9B presents the attrition response using another anionic surfactant, which is stable both in strong acid and alkaline environments and in combination with a second anionic acid stable surfactant that is added only to the strong acid components. The surfactant sold under the trade name Zonyl UR is stable in either an acid or alkaline slurry. The surfactant is added to the CSS alone and then in combination with Zonyl TBS to either the spray drier feed tank or to the acid-alum before forming the binder slurry. All examples show a marked improvement in attrition resistance compared with any of the blank examples that are provided for comparison purposes.

TABLE 9B

CSS PROCESSING WITH ANIONIC TYPE SURFACTANT STABLE IN ACID AND ALKALI ALONE AND IN COMBINATION WITH AN ACID STABLE ANIONIC SURFACTANT ADDED TO OTHER COMPONENTS

| RUN NO. | T-295X | T-296X | T-297X |
|---|---|---|---|
| NaY | 1938 | 1938 | 1938 |
| Alumina | 526 | 526 | 526 |
| Silica sol/Clay | 14818 | 14818 | 14818 |
| Sol pH | 3.1 | 3.1 | 3.1 |
| Feed pH | 3.3 | 3.3 | 3.3 |
| CAI | 4.89 | 2.10 | 2.39 |
| Att./Rate | 0.98 | 0.42 | 0.48 |
| Type of Surfactant(s) | Zonyl UR | Zonyl UR and TBS | Zonyl UR and TBS |
| Add. Point(s) of Surfactant(s) | Clay-Silicate slurry CSS | CSS and TBS into Spray drier Feed Tank | CSS and TBS into acid-alum |
| Amount of Surfactant(s) | 1 gram | 1 gram of each | 1 gram of each |

Example 6
CSS Processing with Addition of Surfactant to Other Catalyst Component Slurries This example illustrates the preparation of catalysts in the CSS processing mode without any surfactant and with only DuPont Zonyl TBS added either to the acid-alum before mixing with the clay-silicate-slurry, CSS, and with Zonyl TBS added to the spray drier feed tank.

The blank runs for this example in the CSS mode were made in the beginning and at the end of the series. This was done so as to demonstrate the reproducibility of the preparation procedures and to determine the effect of Zonyl TBS in the CSS mode wherein the acid-alum and spray drier feed tank have been treated with TBS in separate preparations.

The obtained attrition data are presented in Table 10. The addition to the spray drier feed tank with 2 grams of TBS added per 2442 grams of "as is" kaolin resulted in the hardest catalyst.

TABLE 10

CSS PROCESSING WITH ADDITION OF SURFACTANT TO OTHER CATALYST COMPONENT SLURRIES
STANDARD FORMULATION:
25 Nay, 23 SiO2, 10 CP-2 Al2O3, 42 AF Clay

| RUN NO. | T-275X | T-276X | T-277X | T-278*(3) |
|---|---|---|---|---|
| NaY | 2636(25) | 2636(25) | 2636(25) | 2636(25) |
| Alumina | 526(10) | 526(10) | 526(10) | 526(10) |
| Silica sol | 14818(23) | 14818(23) | 14818(23) | 14818(23) |
| Clay | 14818(23) | 14818(23) | 14818(23) | 14818(23) |
| Sol pH | 3.00 | 3.00 | 3.00 | 3.00 |
| Sol Temp. C. | 28 | 28 | 28 | 29 |
| Feed pH | 3.10(18) | 3.10(18) | 3.10(18) | 3.10(19) |
| CAI | 10.8 | 3.75 | 0.73 | 10.92 |
| Att./Rate | 2.17 Blank | 0.75 | 0.15 | 2.18 Blank |
| Addition point of Surfactant | — | After run-off of CSS with acid-alum | Into spray drier (SD) feed tank | — |
| Type and Amount of Surfactant | — | Zonyl TBS, 2.0 grams | Zonyl TBS, 2.0 grams | — |

Notes:
(1) DuPont Zonyl TBS diluted 1 gram/100 ml water. Components input are shown by weight in grams and the number in ( ) is the percent material on a silica/alumina basis.
(2) Surfactant added on the basis of 1.0 grams per 2442 grams AF clay.
(3) Second blank made to re-confirm processing procedures.

Example 7

Attrition Resistance of Economical Anionic Acid Stable Block Co-Polymers

The data provided in Tables 11A, 11B, and 11C of this example illustrates the improvement in attrition resistance that is achieved with relatively inexpensive anionic acid stable block co-polymers such as BASF Pluronic 25R2 alone and in combination with Zonyl TBS. The combination can be used at low input concentrations and, therefore, is significantly less expensive than using Zonyl TBS alone to obtain the same attrition response for a catalyst.

The sequence of addition of the individual anionic acid stable surfactants is important when combinations of surfactants are used. The sequence of addition permits the maximum benefit in attrition response to be achieved. The preferred sequence of addition and concentrations for combinations of surfactants is the addition of 4 grams of BASF Pluronic 25R2 to the clay slurry followed by 0.25 grams of Zonyl TBS.

TABLE 11A

ORDER OF ADDITION AND OPTIMIZATION FOR COMBINATIONS OF ANIONIC ACID STABLE SURFACTANTS IN CATALYST FORMULATIONS
STANDARD FORMULATION:
25 NaY, 23 SiO2, 10 CP-2 Al2O3, 42 AF Clay

| RUN NO. | T-359X | T-360X | T-361X | T-362X | T-363X |
|---|---|---|---|---|---|
| NaY | 1955(25) | 1955(25) | 1955(25) | 1955(25) | 1955(25) |
| Alumina | 526(10) | 526(10) | 526(10) | 526(10) | 526(10) |
| Silica sol | 11500(23) | 11500(23) | 11500(23) | 11500(23) | 11500(23) |
| Clay | 3591(42) | 3591(42) | 3591(42) | 3591(41) | 3591(42) |
| Sol pH | 3.00 | 3.00 | 3.00 | 3.00 | 3.10 |
| Sol Temp. C. | 37 | 39 | 37 | 38 | 38 |
| Feed pH | 3.30(36) | 3.40(36) | 3.40(35) | 3.40(36) | 3.40(36) |
| CAI | 12.20 | 6.54 | 5.14 | 3.84 | 3.50 |
| Att./Rate | 2.44 | 1.31 | 1.03 | 0.77 | 0.70 |
| Type of Surfactant(s) | — | BASF Block co-polymer Pluronic 25 R 2 | BASF Block co-polymer Pluronic 25 R 2 & Zonyl TBS | BASF Block co-polymer Pluronic 25 R 2 & Zonyl TBS | BASF Block co-polymer Pluronic 25 R 2 |
| Addition Point(s) of Surfactant | | Clay Slurry | Clay Slurry | Clay Slurry | Clay Slurry |
| Amount of Surfactant(s) | | 4.0 grams | 4.0 grams 25 R 2 and 0.5 grams TBS | 4.0 grams 25 R 2 and 0.8 grams TBS | 10.0 grams 25 R 2 |

TABLE 11B

ORDER OF ADDITION AND OPTIMIZATION FOR COMBINATIONS OF ANIONIC ACID STABLE SURFACTANTS IN CATALYST FORMULATIONS
FORMULATION: 25 NaY, 23 SiO2, 10 CP-2 Al2O3, 42 AF CLAY

| RUN NO. | T-400X | T-403X | T-404X | T-405X |
|---|---|---|---|---|
| NaY | 1955(25) | 1955(25) | 1955(25) | 1955(25) |
| Alumina | 526(10) | 526(10) | 526(10) | 526(10) |
| Silica sol | 11500(23) | 11500(23) | 11500(23) | 11500(23) |
| Clay | 4227(42) | 4227(42) | 4227(42) | 4227(42) |
| Sol pH | 3.00 | 3.00 | 3.00 | 3.00 |
| Sol Temp. C. | 28 | 30 | 31 | 30 |
| Feed pH | 3.30(26) | 3.40(28) | 3.20(28) | 3.30(28) |
| CAI | 6.75 | 5.50 | 6.49 | 4.90 |
| Att./Rate | 1.35 | 1.10 | 1.30 | 0.98 |
| Type of Surfactant(s) | BLANK | ZONYL TBS & BASF Co-Polymer Pluronic 25R2 | ZONYL TBS and Pluronic 25R2 | ZONYL TBS and Pluronic 25R2 |
| Amount of Surfactant | | 0.25 grams TBS & then 4.0 grams 25R2 | 2.0 grams 25R2 and then 0.25 grams TBS | 3.0 grams 25R2 and then 0.25 grams TBS |

Notes
All surfactant added to clay slurry before mixing with other components.

TABLE 11C

ORDER OF ADDITION AND OPTIMIZATION FOR COMBINATIONS OF ANIONIC ACID STABLE SURFACTANTS IN CATALYST FORMULATIONS
FORMULATION: 25 NaY, 23 SiO2, 10 CP-2 Al2O3, 42 AF CLAY

| RUN NO. | T-406X | T-407X | T-408X | T-420X |
|---|---|---|---|---|
| NaY | 1955(25) | 1955(25) | 1955(25) | 1955(25) |
| Alumina | 526(10) | 526(10) | 526(10) | 526(10) |
| Silica sol | 11500(23) | 11500(23) | 11500(23) | 11500(23) |
| Clay | 4227(42) | 4227(42) | 4227(42) | 3636(42) |
| Sol pH | 3.00 | 3.00 | 3.00 | 3.00 |
| Sol Temp.C. | 31 | 28 | 28 | 29 |
| Feed pH | 3.30(28) | 3.40(23) | 3.30(23) | 3.30(25) |
| CAI | 2.85 | 2.74 | 3.75 | 5.53 |
| Att./Rate | 0.57 | 0.55 | 0.75 | 1.11 |
| Type of Surfactant | ZONYL TBS and 25R2 | ZONYL TBS and 25R2 | ZONYL TBS and 25R2 | ZONYL TBS and 25R2 |
| Amount of Surfactant | 4.0 grams 25R2 and then 0.25 grams TBS | 2.0 grams 25R2 and then 0.5 grams TBS | 4.0 grams 25R2 and then 0.5 grams TBS | 4.0 grams 25R2 and then 0.10 grams TBS |

Example 8

Attrition Response of Clay Blend

Blends of clay and in particular those containing kaolinite and montmorillonite or kaolinite and calcined clay composed of mullite or incipient mullite-spinel or kaolinite and talc are known to be excellent metal getters for Ni and V as found in gas oil feeds used in catalytic cracking. These same clays and blends of these clays with kaolinite, because of their reactive magnesium (in the case of Fuller's Earth) and alumina (in "mullite" type clays), are also known for their excellent scavenging ability for SOX.

The attrition response of various clay blends using 90 percent AF in standard catalyst formulation are summarized in Tables 12A and 12B. The comparison with the corresponding blank runs demonstrates that each clay blend, which has been treated with Zonyl TBS, produces a finished catalyst with superior attrition resistance.

TABLE 12A

10/90 BLENDS OF BENTONITE-L, TALC, CHETO WITH AIR FLOATED KAOLINITE (AF)
FORMULATION: 25 NaY, 23 SiO2, 10 CP-2 Al2O3, 42 (10/90 BLEND)

| RUN NO. | T-262X | T-263X | T-266X | T-267X | T-268X | T-269X |
|---|---|---|---|---|---|---|
| NaY | 2636(25) | 2636(25) | 2636(25) | 2636(25) | 2636(25) | 2636(25) |
| Alumina | 526(10) | 526(10) | 526(10) | 526(10) | 526(10) | 526(10) |
| Silica sol | 11500(23) | 11500(23) | 11500(23) | 11500(23) | 11500(23) | 11500(23) |
| Clay | 4045(42) | 4045(42) | 3591(42) | 3591(42) | 3682(42) | 3700(42) |
| Sol pH | 3.00 | 3.00 | 3.00 | 3.00 | 3.05 | 3.00 |
| Sol Temp.C. | 26 | 27 | 26 | 28 | 29 | 26 |
| Feed pH | 3.40(18) | 3.40(17) | 3.20(18) | 3.20(18) | 3.40(18) | 3.20(17) |
| CAI | 7.55 | 5.89 | 8.79 | 4.94 | 10.1 | 4.77 |
| Att./Rate | 1.51 | 1.18 | 1.76 | 0.99 | 2.02 | 0.96 |
| Type of Clay Blend | 10 Bent-L w/90 AF | 10 Bent-L w/90 AF | 10 Talc w/90 AF | 10 Talc w/90 AF | 10 Cheto w/90 AF | 10% Cheto w/90% AF |
| Type of Surfactant | — | Zonyl TBS | — | Zonyl TBS | — | Zonyl TBS |
| Addition Point of Surfactant | — | blended clay slurry | — | blended clay slurry | — | blended clay slurry |
| Amount of Surfactant | — | 1 gram | — | 1 gram | — | 1 gram |

Note: Surfactant added on the basis of 1.0 gram per 2442 gram AF clay.

TABLE 12B

10/90 BLENDS OF CALCINE CLAY (ALPHATEX)* AND FULLER'S EARTH WITH AF CLAY
FORMULATION: 25 NaY, 23 SiO2, 10Al2O3, 42 CLAY, 10 ALPHATEX OR FULLER'S 90 AF

| RUN NO. | T-316X | T-318X | T-350X | T-353X | T-354X |
|---|---|---|---|---|---|
| NaY | 1938 | 1938 | 1938 | 1938 | 1938 |
| Alumina | 526 | 526 | 526 | 526 | 526 |
| Silica sol | 11500 | 11500 | 11500 | 11500 | 11500 |
| Clay | 3591 | 3591 | 3591 | 3645 | 3645 |
| Sol pH | 2.9 | 2.9 | 3.0 | 3.0 | 3.0 |
| Sol Temp.C. | 32 | 33 | 38 | 38 | 37 |
| Feed pH | 3.3 | 3.3 | 3.3 | 3.3 | 3.3 |
| CAI | 12.79 | 6.69 | 13.75 | 11.69 | 3.54 |
| Att./Rate | 2.56 | 1.34 | 2.75 | 2.34 | 0.71 |
| Clay Composition | BLANK 90% AF/W 10% Fuller's Earth | 90% AF/W 10% Fuller's Earth | BLANK 100% AF | 90% AF/W 10% Alphatex | 90% AF/W 10% Alphatex |
| Type of Surfactant | ZONYL TBS | | | | ZONYL TBS |
| Addition Pt(s) of Surfactant | Clay slurry | | | | Clay slurry |
| Amount of | 1 gram | | | | 1 gram |

Note: *This is the designation on a commercial grade of calcined clay produced by the English China Clay Company

Example 9

Alkali Stable Anionic Surfactant in Acid Environment

This example illustrates that an alkali stable anionic surfactant function in an over-all strong acid environment and result in catalysts with improved attrition resistance, but at much higher usage levels. The attrition response is summarized in Table 13. This example demonstrates the vulnerability of surfactants in general whereby their functionality can be reduced either through instability in the presence of strong acids or bases or precipitation by ionic species such as calcium and/or magnesium salts. In most instances, adequate functionality is achieved, but at the expense of higher catalyst usage and increased processing costs.

TABLE 13

ATTRITION RESPONSE IN A STANDARD CATALYST FORMULATION USING AN ANIONIC TYPE ALKALINE STABLE SURFACTANT

| RUN NO. | T-338X | T-339X | T-340X | T-341X |
|---|---|---|---|---|
| NaY | 1955(25) | 1955(25) | 1955(25) | 1955(25) |
| Alumina | 526(10) | 525(10) | 526(10) | 526(10) |
| Silica sol | 11500(23) | 11500(23) | 11500(23) | 11500(23) |
| Clay | 3682(42) | 3682(42) | 3682(42) | 3682(42) |
| Sol pH | 3.00 | 3.00 | 3.00 | 3.00 |
| Sol Temp.C. | 37 | 38 | 38 | 38 |

TABLE 13-continued

ATTRITION RESPONSE IN A STANDARD CATALYST
FORMULATION USING AN ANIONIC TYPE ALKALINE
STABLE SURFACTANT

| RUN NO. | T-338X | T-339X | T-340X | T-341X |
|---|---|---|---|---|
| Feed pH | 3.30(33) | 3.30(34) | 3.40(35) | 3.40(35) |
| CAI | 10.81 | 8.79 | 6.98 | 5.30 |
| Att./Rate | 2.16 | 1.76 | 1.40 | 1.06 |
| Addition Point of Surfactant | Blank | Clay Slurry | Clay Slurry | Clay Slurry |
| Type and Amount of Surfactant | — | Zonyl FSA 2.0 grams | Zonyl FSA 4.0 grams | Zonyl FSA 10.0 grams |

Note: Surfactant added on the basis of 1.0 grams per 2442 grams of AF clay. In these examples, 2.0, 4.0 and 10.0 grams per 2442 grams of AF clay are used.

Example 10

Octane Additives with Improved Attrition Resistance when the Clay Component and Spray Drier Feed Tank Contains an Anionic Acid Stable Surfactant This example illustrates the applicability of this invention for improvement in the attrition resistance for non-faujasite containing additives. This example uses a typical FCC catalyst formulation. The faujasite portion is replaced by an equivalent amount of a pentasil type zeolite sold under the tradename ZSM-5 and known to enhance the octane of the gasoline fraction produced via the catalytic cracking of gas oil.

One of the major disadvantages in using additives in conjunction with ordinary types of catalytic cracking catalysts has been their poor physical properties. This has been especially true for high content octane additives using ZSM-5.

Table 14 demonstrates the results for an octane additive formulated with 25 percent ZMS-5 wherein the clay component and spray drier feed tank have been treated with an acid stable anionic surfactant like Zonyl TBS. These results show the importance of having a surfactant like Zonyl TBS present in the feed slurry before spray drying. Catalytic results wherein 5 percent of this additive, C90-3X, when admixed with two low rare earth-containing reference catalysts sold under the trade names Crosfield's XLS and SLS provided a catalytic response that was typical of these combinations or 5 percent C90-3X with either 95 percent XLS or 95 percent SLS.

TABLE 14

ATTRITION RESPONSE OF AN OCTANE ADDITIVE
PREPARED WITH AN ACID STABLE SURFACTANT
FORMULATION: 25 ZSM-%, 23 SiO2, 10 CP-2 Al2O3, 42 AF CLAY

| RUN NO. | C90-1X | C90-2X | C90-3X | C90-4X |
|---|---|---|---|---|
| ZSM-5 | 3929(25) | 3929(25) | 3929(25) | 3929(25) |
| Alumina | 526(10) | 526(10) | 526(10) | 526(10) |
| Silica sol | 11500(23) | 11500(23) | 11500(23) | 11500(23) |
| Clay | 3645(42) | 3645(42) | 3645(42) | 3645(42) |
| Sol pH | 3.00 | 3.00 | 3.00 | 3.00 |
| Sol Temp.C | 27 | 27 | 27 | 28 |
| Feed pH | 3.30(21) | 3.40(21) | 3.10(21) | 3.30(21) |
| CAI | 10.99 | 9.70 | 5.64 | 5.58 |
| Att./Rate | 2.20 | 1.97 | 1.13 | 1.12 |

TABLE 14-continued

ATTRITION RESPONSE OF AN OCTANE ADDITIVE
PREPARED WITH AN ACID STABLE SURFACTANT
FORMULATION: 25 ZSM-%, 23 SiO2, 10 CP-2 Al2O3, 42 AF CLAY

| RUN NO. | C90-1X | C90-2X | C90-3X | C90-4X |
|---|---|---|---|---|
| Type of Surfactant | BLANK | ZONYL TBS | ZONYL TBS | ZONYL TBS |
| Addition Point(s) of surfactant | | clay slurry | clay slurry and SD feed tank | clay slurry and SD feed tank |
| Amount of Surfactant | | 1.0 gram clay slurry | 1.0 gram clay slurry and 1.0 gram in SD feed tank | 1.0 gram clay slurry and 2.0 grams in SD feed tank |

Numerous additive examples without any zeolite or molecular sieve component have been prepared with various combinations of clays as depicted in Tables 12A and 12B. Only blends of clays with binder or with added alumina demonstrated a marked improvement in attrition resistance for these specialty clay type additives. This was achieved when the clay component and/or the spray drier feed tank contained one or more of the acid stable anionic surfactants found to be effective in preparation of zeolite-containing catalysts using these clay blends.

Example 11

Anionic Stable Surfactants

The example illustrates in Tables 15A and 15B that when anionic acid stable surfactants are used in the preparation of FCC catalysts containing zeolites approaching 50% commercially viable catalyst are prepared.

The data of Table 15A demonstrates the marked improvement in attrition resistance when a combination of anionic acid stable surfactants are used for preparing FCC catalyst with a 35% zeolite input. The combination of Zonyl TBS or fluorohydrocarbon and Petrowet R or alkyl sulfonate is most effective. When only Zonyl TBS is used, but added to the silica sol binder, a comparable improvement in attrition resistance is realized.

TABLE 15A

ATTRITION RESPONSE OF CATALYSTS CONTAINING 35%
ZEOLITE USING ZONYL TBS ALONE AND COMBINATION
WITH PETROWET R

| RUN NO. | T-244X | T-245X | T-246X |
|---|---|---|---|
| NaY | 3700(35) | 3700(35) | 3700(35) |
| Alumina | 526(10) | 526(10) | 526(10) |
| Silica sol | 11500(23) | 11500(23) | 11500(23) |
| Clay | 2776(32) | 2776(32) | 2776(32) |
| Sol pH | 3.0 | 3.0 | 3.0 |
| Sol Temp.C | 27 | 27 | |
| Feed pH | 3.1 | 3.0 | 3.3 |
| CAI | 10.30 | 7.82 | 5.90 |
| Att./Rate | 2.10 | 1.60 | 1.20 |
| Type of Surfactant(s) | | Zonyl TBS and Petrowet R | Zonyl TBS |
| Amount of | | 1 gram | 1 gram and 1.5 grams Petrowet R |

TABLE 15A-continued

ATTRITION RESPONSE OF CATALYSTS CONTAINING 35% ZEOLITE USING ZONYL TBS ALONE AND COMBINATION WITH PETROWET R

| Addition Point | Clay Slurry | Both added to Clay Slurry |
|---|---|---|
| RUN NO. | T-217X | T-218X | T-219X |
| NaY | 3700(35) | 3700(35) | 3700(35) |
| Alumina | 526(10) | 526(10) | 526(10) |
| Silica sol | 11500(23) | 11500(23) | 11500(23) |
| Clay | 2776(32) | 2776(32) | 2776(32) |
| Sol pH | 3.0 | 3.0 | 3.0 |
| Sol Temp.C. | 26 | 26 | 26 |
| Feed pH | 3.2 | 3.3 | 3.2 |
| CAI | 10.64 | 8.74 | 5.54 |
| Att./Rate | 2.13 | 1.75 | 1.11 |
| Type of Surfactant(s) | | Zonyl TBS | Zonyl TBS |
| Amount of Surfactant(s) | | 1 gram | 1 gram |
| Addition Point of Surfactant(s) | | added to Clay Slurry | added to Silica sol |

TABLE 15B

ATTRITION RESPONSE OF CATALYSTS CONTAINING 50% ZEOLITE USING ZONYL TBS ALONE

| RUN NO. | T-306X | T-307X | T-308X |
|---|---|---|---|
| NaY | 3876(50) | 3876(50) | 3876(50) |
| Alumina | 526(10) | 526(10) | 526(10) |
| Silica sol | 11500(23) | 11500(23) | 11500(23) |
| Clay | 1475(17) | 1475(17) | 1475(17) |
| Sol pH | 3.0 | 3.2 | 3.1 |
| Sol Temp.C. | 33 | 36 | 38 |
| Feed pH | 3.3 | 3.4 | 3.4 |
| CAI | 11.21 | 11.26 | 8.39 |

TABLE 15B-continued

ATTRITION RESPONSE OF CATALYSTS CONTAINING 50% ZEOLITE USING ZONYL TBS ALONE

| RUN NO. | T-306X | T-307X | T-308X |
|---|---|---|---|
| Att./Rate | 2.24 | 2.25 | 1.68 |
| Type of Surfactant | | Zonyl TBS | Zonyl TBS |
| Amount of Surfactant | | 2 grams | 4 grams |
| Addition Point of Surfactant | | Clay Slurry | Clay Slurry |

The zeolite level is increased to 50 percent and, with the addition of 4 grams of Zonyl TBS to the clay slurry, a significant improvement in attrition resistance results. This improvement is such that catalysts formulated at this level of zeolite can function adequately in a commercial fluid catalytic cracking unit. A given refiner using a catalyst formulated in this manner obtains the advantage of the improved yield and selectivity for certain types of gas oil feeds without severe and uneconomical catalyst losses.

Example 12
Clay Variations

This example illustrates the desirable characteristics provided by the invention when coarser clays are used. The clays in Table 16 are commercially available from Georgia-Kaolin. These clays represent a variety of grades as determined by "coarseness" or average particle size. This example demonstrates that the invention provides catalysts having desirable attrition resistance without the use of faujasite clay.

TABLE 16

RUNS USING G-K CLAYS
Composition: 25 NaY, 23 SiO2, 10Al2O3, 42 Clay

| RUN No. | DESCRIPTION | AI | FINES | CAI | RATE | PARTICLE SIZE % < 2* |
|---|---|---|---|---|---|---|
| T-254X | AF BLANK | 10.99 | 2.62 | 8.37 | 1.68 | >90 |
| T-255X | KCS SD-BLANK | 14.03 | 3.98 | 10.05 | 2.01 | 82 |
| T-256X | KCS SD 1GM P-28 in CLAY SLURRY | 10.04 | 2.49 | 7.55 | 1.51 | 82 |
| T-257X | VELVACAST-BLANK | 27.3 | 2.53 | 24.77 | 4.95 | 35 |
| T-258X | VELVACAST-1GM P-28 in CLAY SLURRY | 16.8 | 1.61 | 15.2 | 3.04 | 35 |
| T-259X | KAOMER-BLANK | 13.35 | 3.32 | 10.03 | 2.01 | 96 |
| T-260X | KAOMER-1GM P-28 in CLAY SLURRY | 5.85 | 3.07 | 2.78 | 0.56 | 96 |

Note *Clay producers grade clay on the basis of the percentage of particles less than 2 microns

We claim:
1. A process for improving the physical properties of a non-catalytic or separation-type material which comprises adding an effective amount of acid stable anionic fluorohydrocarbon surfactant to a mixture of at least two inorganic oxides and drying said inorganic oxides into fluid particles.

2. The process of claim 1 wherein said mixture of said inorganic oxides includes a member selected from the group consisting of alumina, silicon dioxide, silicon monoxide, zinc oxide, titanium oxide, and mixtures of these.

3. The process of claim 1 further comprising:
   blending said mixture of at least two inorganic oxide sand said acid stable anionic fluorohydrocarbon surfacant;
   adding at least one clay to said blend of said mixture of at least two inorganic oxides and said acid stable anionic fluorohydrocarbon surfacant; and spray drying said blend of said clay, said mixture of at least two inorganic oxides, and said acid stable anionic fluorohydrocarbon surfactant.

4. The process of claim 3 wherein said clay includes a member selected from the group consisting of kaolinite, montmorillonite, metakaolin, calcined kaolinite, talc, bentonite, and mixtures of these.

5. A process for improving the physical properties of a non-catalytic or separation-type material comprising:

blending in an aqueous solution a scavenging separation-type material, a binder, and an anionic acid stable surfactant;

blending said aqueous solution of said scavenging separation-type material, said binder, and said anionic acid stable surfactant with a clay, said clay being a member selected from the group consisting of kaolinite, montmorillonite, metakaolin, calcined kaolinite, talc, bentonite, and mixtures of these;

spray drying said blend of said clay, said scavenging separation-type material, said binder, and said anionic acid stable surfactant.

6. The process of claim 5 wherein said scavenging-type material is a SOX separation-type material comprising a mixture of at least two inorganic oxides.

7. The process of claim 5 wherein said two inorganic oxides are zinc oxide and titanium oxide.

8. The process of claim 7 wherein said anionic acid stable surfactant is an anionic fluorohydrocarbon surfactant.

* * * * *